US008754312B2

(12) United States Patent
Wilson

(10) Patent No.: US 8,754,312 B2
(45) Date of Patent: Jun. 17, 2014

(54) NECKS FOR STRING INSTRUMENTS

(76) Inventor: Darren Michael Wilson, Oakville (CA)

( * ) Notice: Subject to any disclaimer, the term of this patent is extended or adjusted under 35 U.S.C. 154(b) by 163 days.

(21) Appl. No.: 13/431,948

(22) Filed: Mar. 27, 2012

(65) Prior Publication Data

US 2013/0255465 A1 Oct. 3, 2013

(51) Int. Cl.
*G01D 3/00* (2006.01)

(52) U.S. Cl.
USPC .......... 84/291

(58) Field of Classification Search
USPC .......... 84/291
See application file for complete search history.

(56) References Cited

U.S. PATENT DOCUMENTS 3,091,150 A 5/1963 Sceusa
3,143,028 A 8/1964 Fender
4,237,765 A 12/1980 Valdez
4,759,250 A 7/1988 Lieber
4,953,435 A 9/1990 Chapman
5,239,908 A 8/1993 Attias
5,337,644 A 8/1994 Fishman et al.
5,511,455 A 4/1996 Steinberger
6,034,310 A * 3/2000 Kolano .......... 84/293
D630,676 S 1/2011 Toone

* cited by examiner

*Primary Examiner* — Jianchun Qin
(74) *Attorney, Agent, or Firm* — Steven M. Greenberg; CRGO Law

(57) ABSTRACT

A neck for a string instrument is provided with a shape that varies along the length of the neck to facilitate an appropriate hand posture at various longitudinal positions on the neck. The neck has a heel end for receiving a body of a string instrument, a head end relative to the heel end, and a fingerboard surface. Adjacent the fingerboard surface, the bass side of the neck is chamfered, relative to the treble side of the neck, from an intermediate position between the heel end and the head end of the neck toward the heel end of the neck, for accommodating a user's thumb when fretting in an upper register portion of the neck.

18 Claims, 10 Drawing Sheets

NECKS FOR STRING INSTRUMENTS

TECHNICAL FIELD

The present disclosure relates to string instruments, and more particularly to necks for string instruments.

BACKGROUND

There have been a number of attempts to modify the traditional shape of the neck of a string instrument in order to facilitate ease of playing or to improve music quality.

U.S. Pat. No. 3,091,150 to Sceusa teaches a string instrument neck having a parabolic cross-section, with its apex offset from the center of the fingerboard and disposed in one quarter of the width of the fingerboard adjacent the bass edge thereof, with the long side of the parabola extending into the remaining three quarters of the fingerboard. According to Sceusa, this design allows the palm of the hand to be more comfortably extended and make it easier for the fingers to span over the treble edge of the fingerboard while permitting the thumb to depress the bass strings.

U.S. Pat. No. 4,759,250 to Lieber teaches a string instrument neck having a central ridge on the undersurface to provide a contact surface for the player's hand during playing of the instrument.

U.S. Pat. No. 4,237,765 to Valdez teaches guitars having a neck with distinct, longitudinally spaced-apart thumb-receiving notches in the back surface of the neck.

U.S. Pat. No. 5,239,908 to Attias teaches a string instrument neck having one or move concave depressions in the neck extending longitudinally along substantially the entire length of the neck, including embodiments having straight, sloping surfaces.

SUMMARY

String instrument necks described in the present disclosure are shaped to accommodate the need for different hand positions of a player's fretting hand depending on the longitudinal position on the neck.

In one aspect, a string instrument neck has a heel end for receiving a body of a string instrument, a head end relative to the heel end, a longitudinally extending bass side and a longitudinally extending treble side opposite the bass side, and a fingerboard surface. Adjacent the fingerboard surface, the bass side of the neck is continuously chamfered, relative to the treble side of the neck, from an intermediate position between the heel end and the head end of the neck toward the heel end of the neck, for accommodating a user's thumb.

In one embodiment, from the head end to the intermediate position, the neck is substantially semi-elliptical in cross-section. In other embodiments, the neck may be substantially V-shaped or substantially D-shaped in cross-section from the head end to the intermediate position.

The bass side of the neck may be chamfered to be substantially planar from the intermediate position toward the heel end of the neck, or may be chamfered to be convex or concave from the intermediate position toward the heel end of the neck.

In another aspect, a string instrument neck has a heel end for receiving a body of a string instrument, a head end relative to the heel end, a longitudinally extending bass side and a longitudinally extending treble side opposite the bass side, and a fingerboard surface. The neck comprises a lower register portion extending from adjacent the head end toward the heel end, an upper register portion extending from adjacent the heel end toward the head end, and an intermediate portion between the lower register portion and the upper register portion. The neck has an elongate ridge extending at least through the upper register portion of the neck toward the heel end thereof and a flattened thumb-support region in at least the upper register portion of the neck. The thumb-support region extends between the ridge and the fingerboard surface on the bass side of the neck.

Preferably, the ridge deviates toward the bass side of the neck as the ridge approaches the heel end of the neck. Also preferably, the ridge extends from the intermediate portion of the neck through the upper register portion of the neck.

The flattened thumb-support region may be substantially planar, or may be convex or concave.

In one embodiment, in the lower register portion the neck is substantially semi-elliptical in cross-section; in other embodiments the lower register portion of the neck may be substantially V-shaped in cross-section or substantially D-shaped in cross-section.

In a further aspect, a string instrument neck has a heel end for receiving a body of a string instrument, a head end relative to the heel end and a fingerboard surface. The neck comprises a lower register portion extending from adjacent the head end toward the heel end, an upper register portion extending from adjacent the heel end toward the head end, and an intermediate portion between the lower register portion and the upper register portion. The neck is substantially arch-shaped opposite the fingerboard surface through the lower register portion into the intermediate portion, and in at least the upper register portion, one haunch of the neck is flattened relative to an opposite haunch of the neck to accommodate a user's thumb when fretting in the upper register portion of the neck.

In one embodiment, the neck is substantially semi-elliptical in cross-section opposite the fingerboard surface through the lower register portion into the intermediate portion. In another embodiment, the neck is substantially V-shaped in cross-section opposite the fingerboard surface through the lower register portion into the intermediate portion, and in still another embodiment the neck is substantially D-shaped in cross-section opposite the fingerboard surface through the lower register portion into the intermediate portion.

A string instrument may comprise a body and a neck as described above, with the heel end of the neck secured to the body. The string instrument may further comprise a plurality of strings, with each string secured at each end to the string instrument so that the strings extend from the body along the neck. The string instrument may be, for example, a guitar.

In some embodiments of necks as described above, the fingerboard surface may form an integral fingerboard; in other embodiments a fingerboard may be secured on the fingerboard surface.

BRIEF DESCRIPTION OF THE DRAWINGS

These and other features will become more apparent from the following description in which reference is made to the appended drawings wherein.

DETAILED DESCRIPTION

Figures 1, 2, 3, 4, 5:
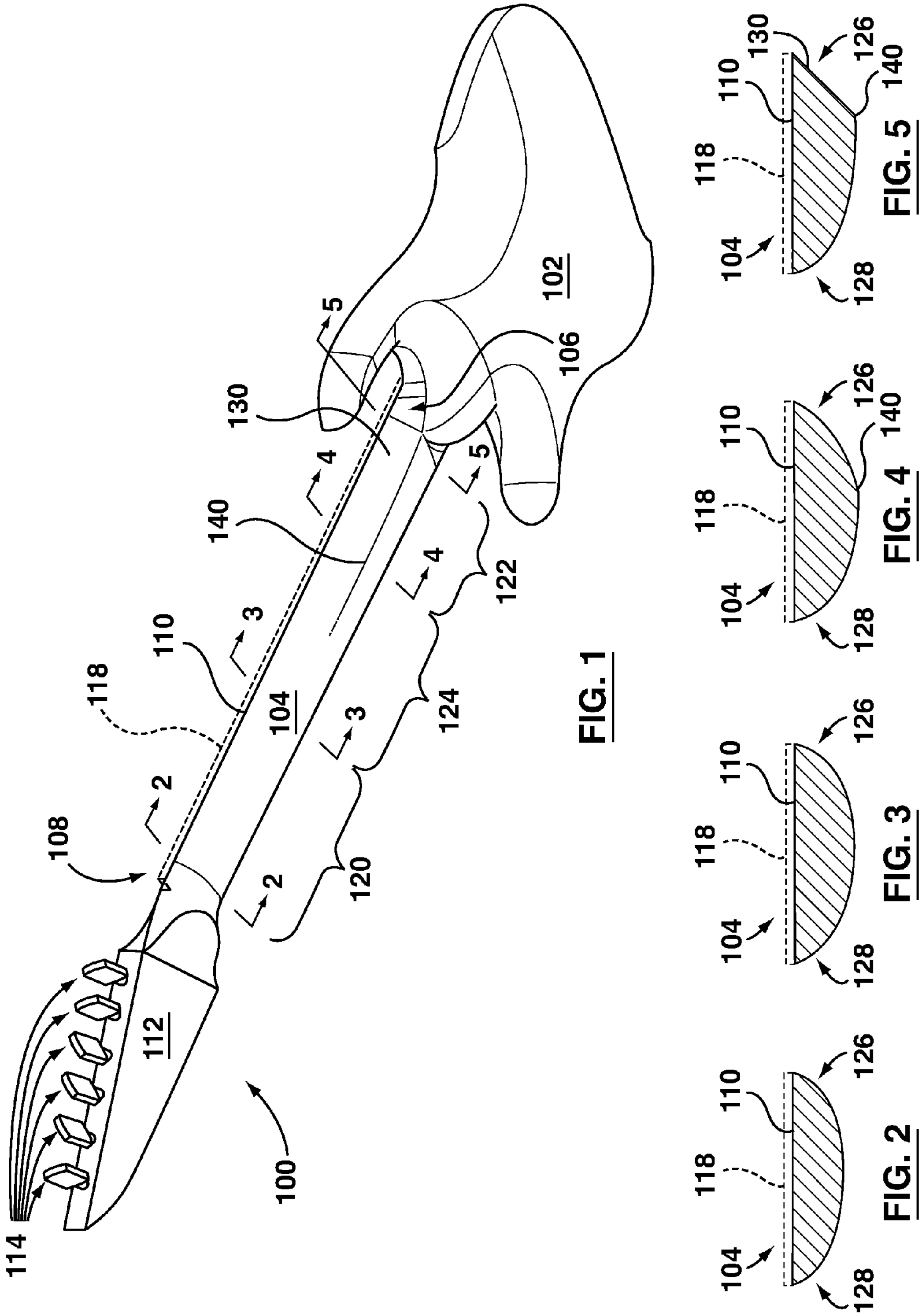
FIG. 1 is a perspective view of a first exemplary guitar.
FIG. 2 is a cross-sectional view of the neck of the guitar of FIG. 1, taken along the line 2-2 in FIG. 1.
FIG. 3 is a cross-sectional view of the neck of the guitar of FIG. 1, taken along the line 3-3 in FIG. 1.
FIG. 4 is a cross-sectional view of the neck of the guitar of FIG. 1, taken along the line 4-4 in FIG. 1.
FIG. 5 is a cross-sectional view of the neck of the guitar of FIG. 1, taken along the line 5-5 in FIG. 1.
Figure 1A:
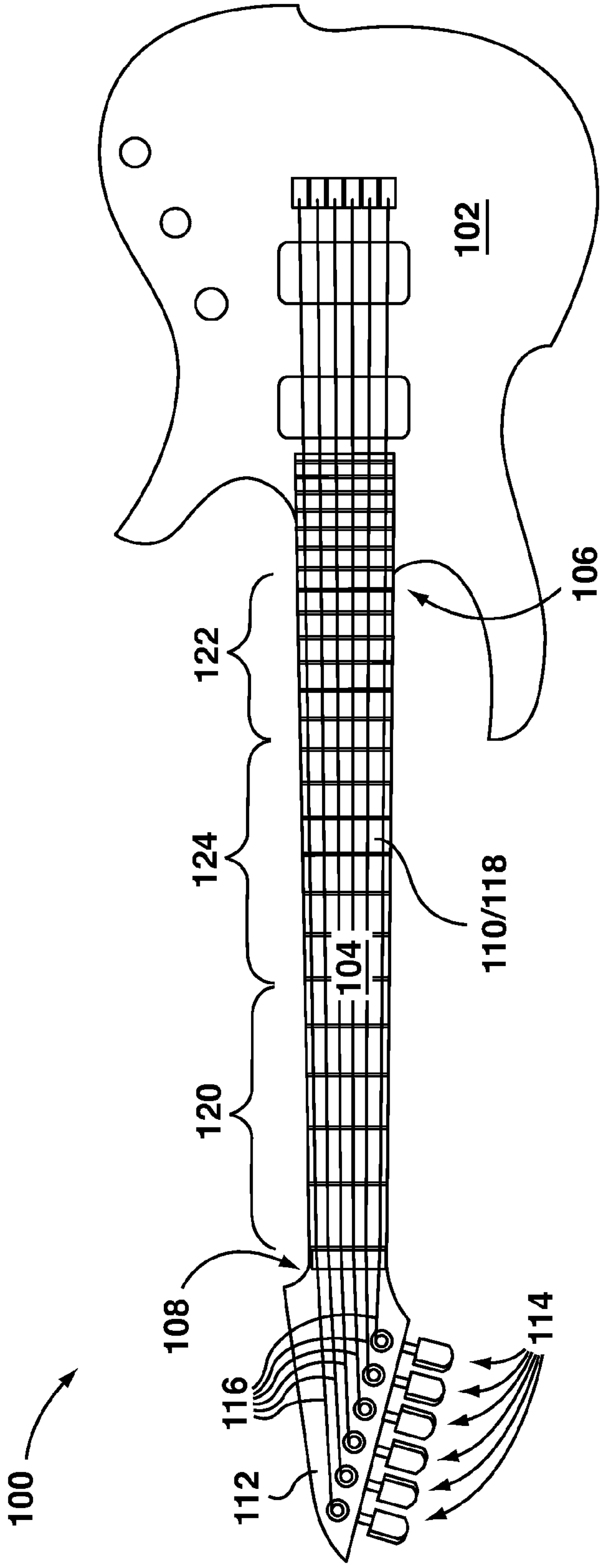
FIG. 1A is a top plan view of the guitar of FIG. 1.

Reference is now made to FIGS. 1 and 1A, which show a first exemplary guitar 100, in particular an electric guitar, as illustrative of an exemplary string instrument. The first exemplary guitar 100 comprises a body 102 and a neck 104 secured to the body 102. The body 102 shown in FIG. 1 is exemplary only, and a body of any suitable shape may be used.

The neck 104 comprises a heel end 106 for receiving the body 102 of the guitar 100, a head end 108 relative to the heel end 106, and a fingerboard surface 110. The first exemplary electric guitar 100 further comprises a headstock 112 that is secured to the head end 108 of the neck 104, and includes machine heads 114 for receiving the ends of each of a plurality of strings 116. As is known in the art, one end of each string 116 is secured on the body 102 and the other end of each string 116 is secured on the headstock 112 by the machine heads 114, so that the strings 116 extend from the body 102 along the neck 104 (FIG. 1A). In the exemplary embodiment shown in FIGS. 1 to 5, a separate fingerboard 118 (shown with dashed lines) is secured on the fingerboard surface 110; in other embodiments the fingerboard surface 110 may form a fingerboard that is integral with the neck 104. The fingerboard surface 110 and/or fingerboard 118 may extend beyond the heel end 106 onto the body of the guitar, and the fingerboard surface 110 and/or fingerboard 118 generally tapers from narrower adjacent the head end 108 to wider adjacent the heel end 106.

In some embodiments, the neck 104 may terminate at or extend only slightly into the body 102. In other embodiments, the neck may include a projection that extends beyond the heel end and that will extend into and through the body of the guitar. For example, in some embodiments the neck may be mounted to the body by securing opposed wings to the sides of the neck to form the body.

Basic principles for construction of electric guitars, and of string instruments in general, is well known in the art, and therefore is not described further.

Continuing to refer to FIG. 1, the neck 104 comprises a lower register portion 120 extending from adjacent the head end 108 toward the heel end 106, an upper register portion 122 extending from adjacent the heel end 106 toward the head end 108, and an intermediate portion 124 between the lower register 122 portion and the upper register portion 120. The lower register portion 120 transitions smoothly into the intermediate portion 124, which in turn transitions smoothly into the upper register 122 portion. The neck 104 has a bass side 126 and a treble side 128 (FIGS. 2 to 5). The bass side 126 and the treble side 128 each extend longitudinally along the length of the neck 106. The strings, when strung, generally decrease in diameter from the bass side 126 to the treble side 128.

Reference is now made to FIGS. 2 to 5. The neck 104 is substantially symmetrically arch-shaped opposite the fingerboard surface 110 through the lower register portion 120 into the intermediate portion 124 (FIGS. 2 and 3), while in the upper register portion 122 and optionally the part of the intermediate portion 124 that is closest to the upper register portion 122, the bass side 126 of the neck 104 is continuously chamfered, relative to the treble side 128 of the neck 104, so as to form an elongate flattened thumb-support region 130 on the bass side 126 of the neck 104. The thumb-support region 130 is disposed in and extends through the upper register portion 122 of the neck 104, adjacent the fingerboard surface 110. The thumb-support region 130 is flattened relative to the lower register portion 120 of the neck 104 on the bass side 126. As can be seen, the chamfering is progressive, increasing toward the heel end 106 of the neck 104, and is continuous along the upper register portion 122.

As can be seen in FIG. 4 and particularly in FIG. 5, the flattened thumb-support region 130 formed by the chamfering results in an asymmetrical cross-sectional shape of the neck 104 in the upper register portion 122 thereof. Thus, while the neck 104 has a substantially symmetrical arch shape opposite the fingerboard surface 110 through the lower register portion 120 into the intermediate portion 124, in the upper register portion 122 and the part of the intermediate portion 124 that is closest to the upper register portion 122, one haunch of the arch formed by the neck 104 is flattened relative to the opposite haunch.

As best seen in FIG. 1 and in FIGS. 4 and 5, an elongate ridge 140 extends at least through the upper register portion 122 of the neck 104 toward the heel end 106 thereof, and preferably from the intermediate portion 124 of the neck 104 through the upper register portion 122 of the neck 104 toward the heel end 106. The ridge 140 does not maintain constant relative spacing from each side 126, 128 of the neck 104, but instead the ridge 140 deviates toward the bass side 126 of the neck 104 as the ridge 140 approaches the heel end 106 of the neck 104. Thus, in at least the upper register portion 122 of the neck 104, the ridge 140 is closer to the bass side 126 of the neck 104, which has the thumb-support region 130, than to the treble side 128 of the neck 104.

As best seen in FIG. 5, the thumb-support region 130 extends between the ridge 140 and the fingerboard surface 110. In the exemplary embodiment shown in FIGS. 1 to 5, the neck 104 is chamfered, and the thumb-support region 130 therefore runs, only from an intermediate position between the heel end 106 and the head end 108 of the neck 104 toward the heel end 106 of the neck 104, leaving the remainder of the neck 104 from the intermediate position to the head end substantially arch-shaped opposite the fingerboard surface 110, as shown in FIGS. 2 and 3.

Figures 2A, 3A, 4A, 5A:
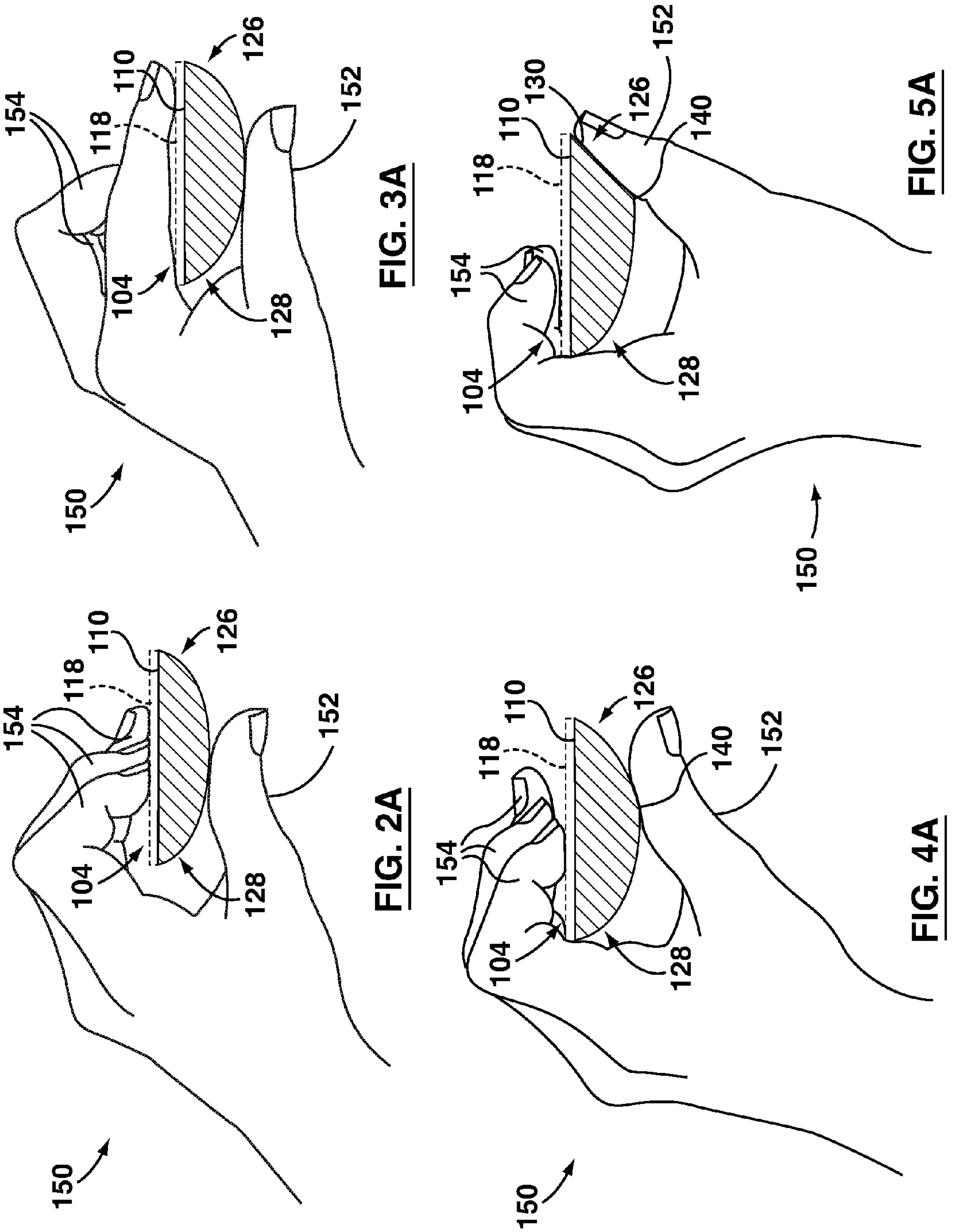
FIG. 2A is the same cross-sectional view shown in FIG. 2, showing exemplary finger and thumb positions of a fretting hand on that part of the neck of the guitar of FIG. 1.
FIG. 3A is the same cross-sectional view shown in FIG. 3, showing exemplary finger and thumb positions of a fretting hand on that part of the neck of the guitar of FIG. 1.
FIG. 4A is the same cross-sectional view shown in FIG. 4, showing exemplary finger and thumb positions of a fretting hand on that part of the neck of the guitar of FIG. 1.
FIG. 5A is the same cross-sectional view shown in FIG. 5, showing exemplary finger and thumb positions of a fretting hand on that part of the neck of the guitar of FIG. 1.

Referring now to FIGS. 2A to 5A, which show exemplary positions of a guitarist's fretting hand 150 on the neck 104 when playing various notes, it will be seen that the thumb-support region 130 accommodates a guitarist's thumb 152 when the guitarist is fretting in the upper register portion 122. As seen in FIGS. 2A to 3A, when the guitarist's hand 150 is positioned on the lower register portion 120 or the intermediate portion 124 of the neck 104, the guitarist's thumb 152 will generally be positioned at or near the vertex of the arch formed by the neck 104. Because the neck 104 is narrower in the lower register portion 120 and the intermediate portion 124 than in the upper register portion 122, with the thumb 152 positioned at the vertex of the arch formed by the neck 104, the guitarist's fingers 154 can easily manipulate the strings on the fingerboard surface 110/fingerboard 118. Referring now to FIG. 4A, as the guitarist's hand 150 begins to transition from the intermediate portion 124 to the upper register portion 122, the ridge 140 can function as a guide for the guitarist when he or she wishes to move his or her thumb 152 toward the bass side 126 of the neck 104 while moving his or her hand 150 into the upper register portion 122. The ridge 140 may also serve as a guide for positioning the thumb 152 when the guitarist's hand 150 is in the part of the intermediate portion 124 of the neck 104 that is closest to the upper register portion 122 of the neck 104. When the guitarist's hand 150 is in the upper register portion 122 of the neck 104, his or her thumb 152 can rest on the thumb-support surface 130, as shown in FIG. 5A, enabling the guitarist's fingers 154 to more easily reach and manipulate the strings on the fingerboard surface 110/fingerboard 118.

As the guitarist's hand 150 moves through the intermediate portion 124 and the upper register portion 122 toward the heel end 106, the thumb 152 may be guided by the ridge 140 and the thumb-support surface 130 from being substantially parallel to the fingerboard surface 110/fingerboard 118 (FIG. 3A) to being at an oblique angle with the fingerboard surface 110/fingerboard 118 (FIG. 5A). This process may be reversed as the guitarist's hand 150 moves away from the heel end 106 through the upper register portion 122 and into the intermediate portion 124.

Thus, the chamfering of the neck 104 and the resulting thumb-support surface 130 accommodate the user's thumb 152 when fretting in the upper register portion 122. Moreover, while chording in the intermediate portion 124 and the upper register portion 120, the ridge 140 creates a point of leverage for the thumb 152 of the fretting hand 150, assisting in the execution of chords. In addition, the thumb-support surface 130 may provide a plane against which leverage may be applied, in order to facilitate string bending and enable vibrato techniques to be more easily executed with the fingers 154.

The particular hand positions shown in FIGS. 2A to 5A are merely exemplary, and a skilled guitarist, now informed by the herein disclosure, will appreciate that the number of possible hand positions is considerably more diverse.

Figure 5C:
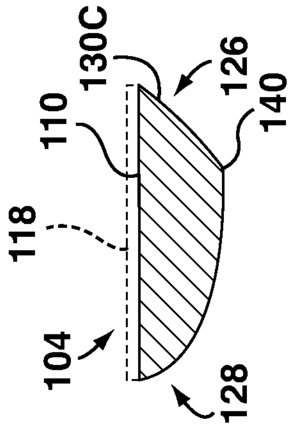
FIG. 5C is a cross-sectional view of a second alternate embodiment of the neck of the guitar of FIG. 1, corresponding in longitudinal position to the cross-sectional view shown in FIG. 5A.
Figure 5B:
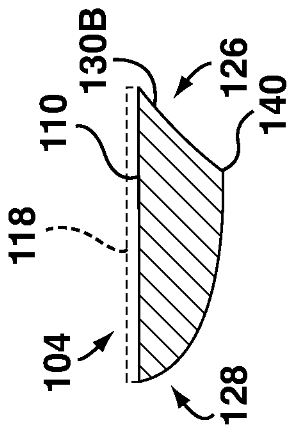
FIG. 5B is a cross-sectional view of a first alternate embodiment of the neck of the guitar of FIG. 1, corresponding in longitudinal position to the cross-sectional view shown in FIG. 5A.
Figure 6:
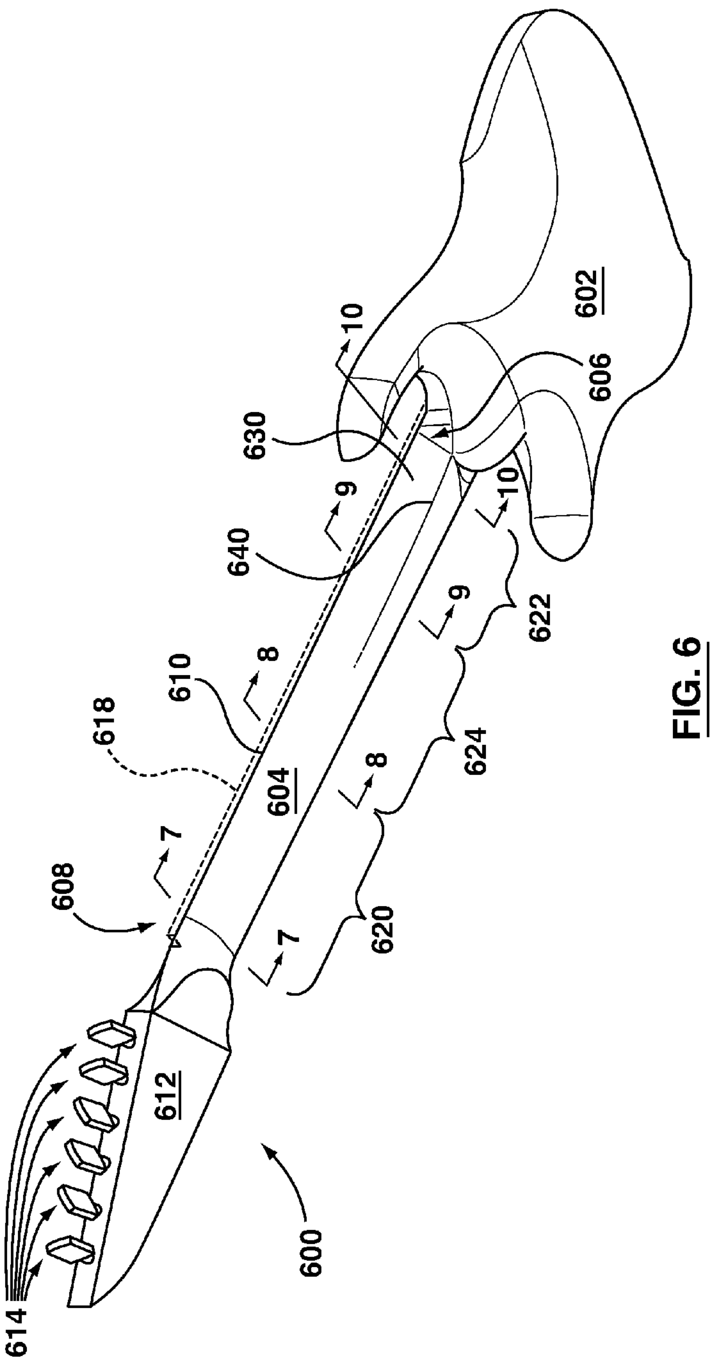
FIG. 6 is a perspective view of a second exemplary guitar.
Figure 9:
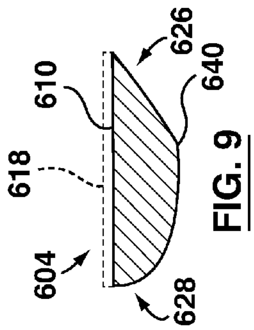
FIG. 9 is a cross-sectional view of the neck of the guitar of FIG. 6, taken along the line 9-9 in FIG. 6.
Figure 8:
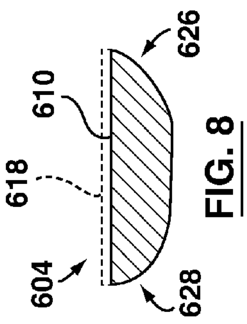
FIG. 8 is a cross-sectional view of the neck of the guitar of FIG. 6, taken along the line 8-8 in FIG. 6.
Figure 7:
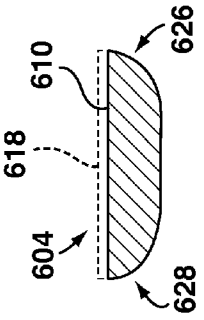
FIG. 7 is a cross-sectional view of the neck of the guitar of FIG. 6, taken along the line 7-7 in FIG. 6.
Figure 7A:
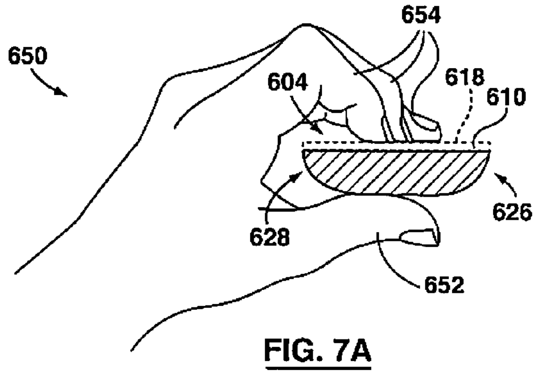
FIG. 7A is the same cross-sectional view shown in FIG. 7, showing exemplary finger and thumb positions of a fretting hand on that part of the neck of the guitar of FIG. 6.
Figure 8A:
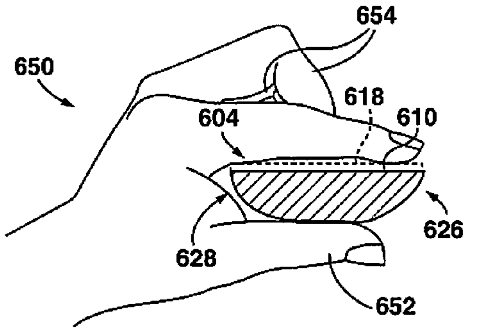
FIG. 8A is the same cross-sectional view shown in FIG. 8, showing exemplary finger and thumb positions of a fretting hand on that part of the neck of the guitar of FIG. 6.
Figure 9A:
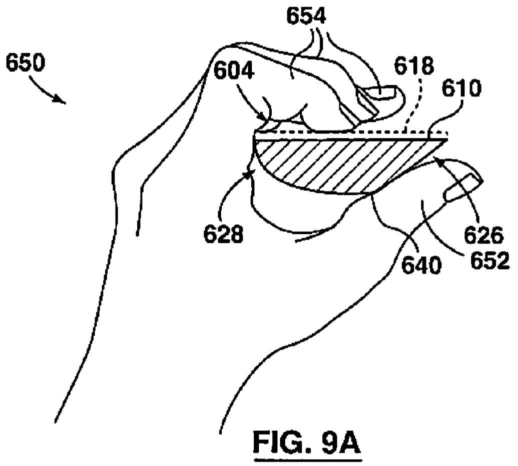
FIG. 9A is the same cross-sectional view shown in FIG. 9, showing exemplary finger and thumb positions of a fretting hand on that part of the neck of the guitar of FIG. 6.

In the exemplary embodiment shown in FIGS. 1 to 5A, the bass side 126 of the neck 104 is chamfered so that the resulting thumb-support surface 130 is substantially planar; in other embodiments the bass side 126 of the neck 104 may be chamfered so as to have a slightly concave thumb-support surface 130B (FIG. 5B) or a slightly convex thumb-support surface 130C (FIG. 5C).

In the first exemplary guitar 100 shown in FIGS. 1 to 5A, the neck 104, aside from the chamfering and associated thumb-support surface 130, is substantially semi-elliptical in cross-section. This is often referred to as a "C" neck. With the chamfering and associated thumb-support surface 130, the neck 104 is substantially semi-elliptical in cross-section opposite the fingerboard surface 110 through the lower register portion 120 into the intermediate portion 124, that is, from the head end 108 to the intermediate position where the chamfering begins.

The chamfering and associated thumb-support surface can also be applied to other shapes of guitar necks, such as "V" necks and "D" necks.

Reference is now made to FIGS. 6 to 10A, which show a second exemplary guitar 600, which is an electric guitar. The second exemplary guitar 606 is similar to the first exemplary guitar 106, and corresponding reference numerals are used to refer to corresponding features, except with the prefix "6" instead of "1". (The second exemplary guitar 606 shown in FIGS. 6 to 10A would appear substantially identical in top plan view to the first exemplary guitar 100.) The neck 604 of the second exemplary guitar 600 is a "D" neck that is chamfered on the bass side 626 of the neck (relative to the treble side 628) in the upper register portion 622 and optionally the part of the intermediate portion 624 that is closest to the upper register portion 622, thereby forming an elongate flattened thumb-support surface 630 on the bass side 626 of the neck 604 in the upper register portion 622 thereof. The chamfering is progressive, and increases toward the heel end 606. As with the first exemplary guitar 100, in the second exemplary guitar 600, an elongate ridge 640 extends from the intermediate portion 624 of the neck 604 through the upper register portion 622 of the neck 604 toward the heel end 606, and the ridge 640 deviates toward the bass side 626 of the neck 604 as the ridge 640 approaches the heel end 606 of the neck 604. The thumb-support region 630 extends between the ridge 640 and the fingerboard surface 610. As can be seen in FIGS. 6 to 10A the ridge 640 is closer to the bass side 626 of the neck 604 than to the treble side 628 in the upper register portion 622 of the neck 604. Thus, the neck 604 of the second exemplary guitar 600 is substantially D-shaped in cross-section opposite the fingerboard surface 610 through the lower register portion 620 into the intermediate portion 624, i.e., from the head end 608 to the intermediate position where the chamfering begins.

Figure 10:
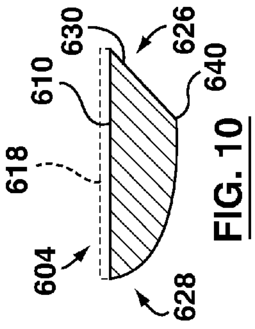
FIG. 10 is a cross-sectional view of the neck of the guitar of FIG. 6, taken along the line 10-10 in FIG. 6.
Figure 10A:
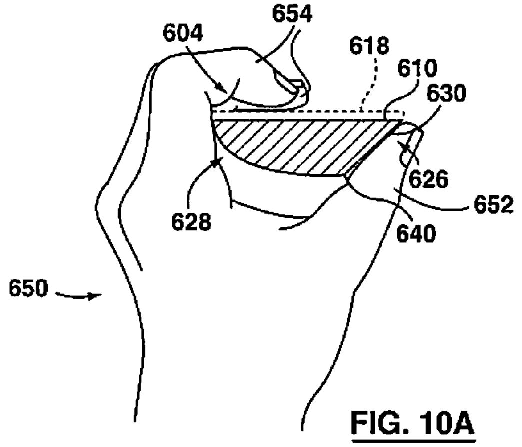
FIG. 10A is the same cross-sectional view shown in FIG. 10, showing exemplary finger and thumb positions of a fretting hand on that part of the neck of the guitar of FIG. 6.
Figure 10C:
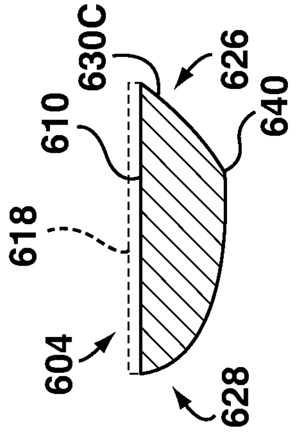
FIG. 10C is a cross-sectional view of a second alternate embodiment of the neck of the guitar of FIG. 6, corresponding in longitudinal position to the cross-sectional view shown in FIG. 10A.
Figure 10B:
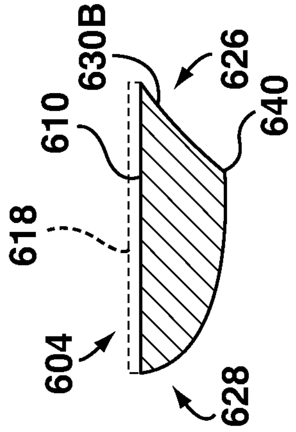
FIG. 10B is a cross-sectional view of a first alternate embodiment of the neck of the guitar of FIG. 6, corresponding in longitudinal position to the cross-sectional view shown in FIG. 10A.
Figure 11:
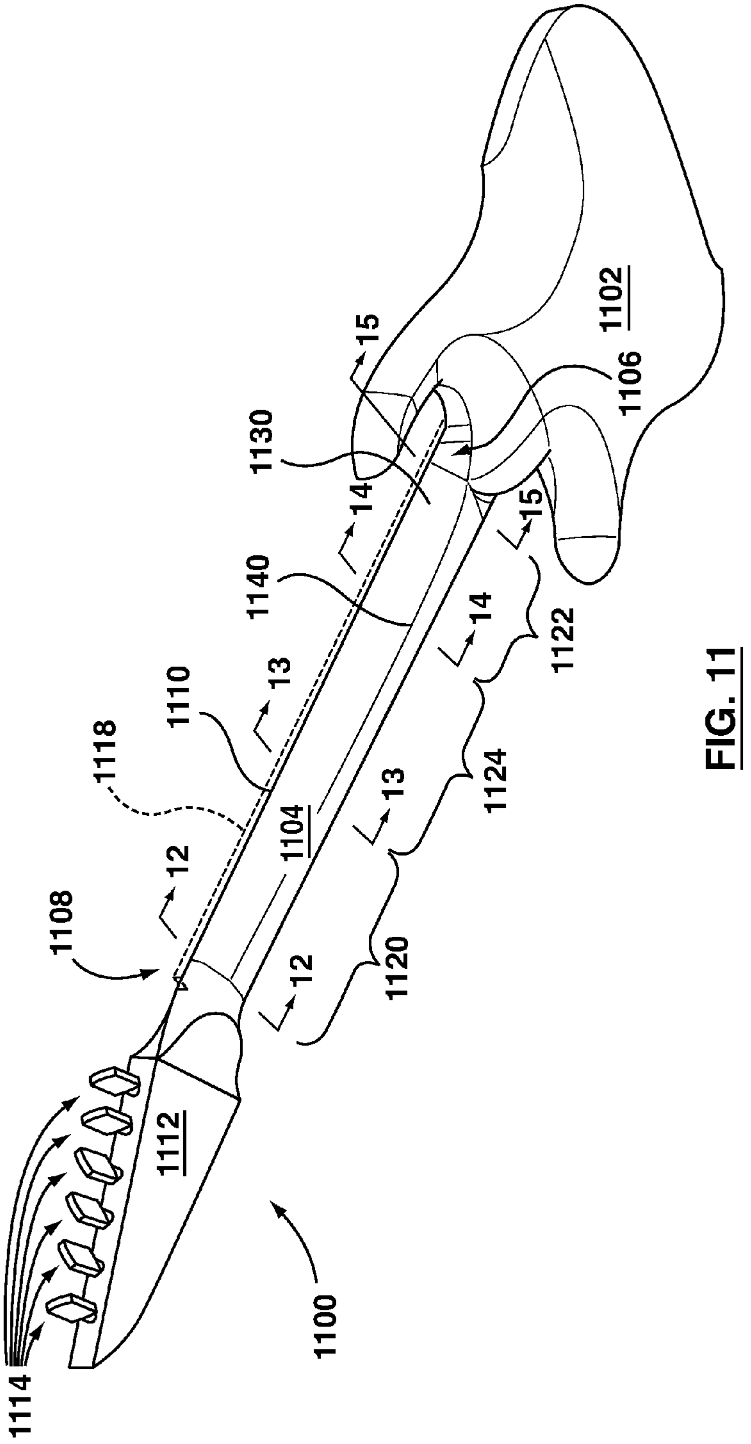
FIG. 11 is a perspective view of a third exemplary guitar.
Figure 12:
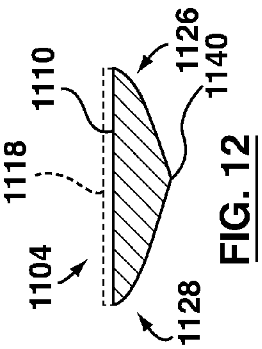
FIG. 12 is a cross-sectional view of the neck of the guitar of FIG. 11, taken along the line 12-12 in FIG. 11.
Figure 13:
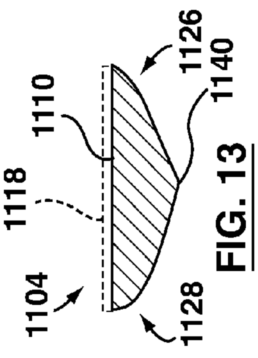
FIG. 13 is a cross-sectional view of the neck of the guitar of FIG. 11, taken along the line 13-13 in FIG. 11.
Figure 14:
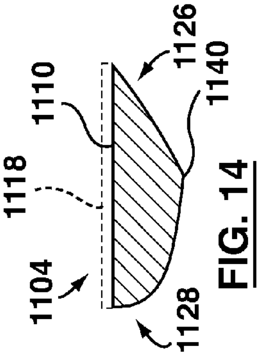
FIG. 14 is a cross-sectional view of the neck of the guitar of FIG. 11, taken along the line 14-14 in FIG. 11.
Figure 13A:
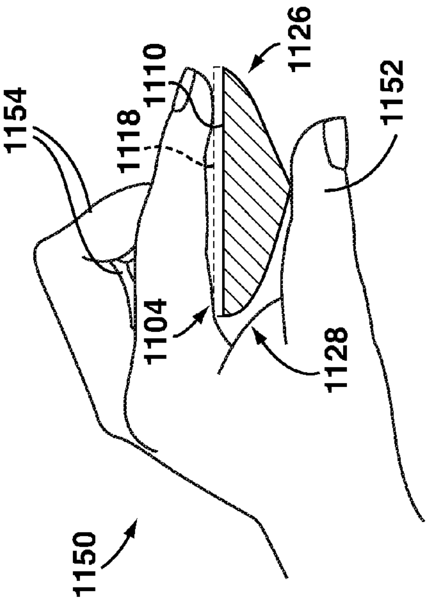
FIG. 13A is the same cross-sectional view shown in FIG. 13, showing exemplary finger and thumb positions of a fretting hand on that part of the neck of the guitar of FIG. 11.
Figure 12A:
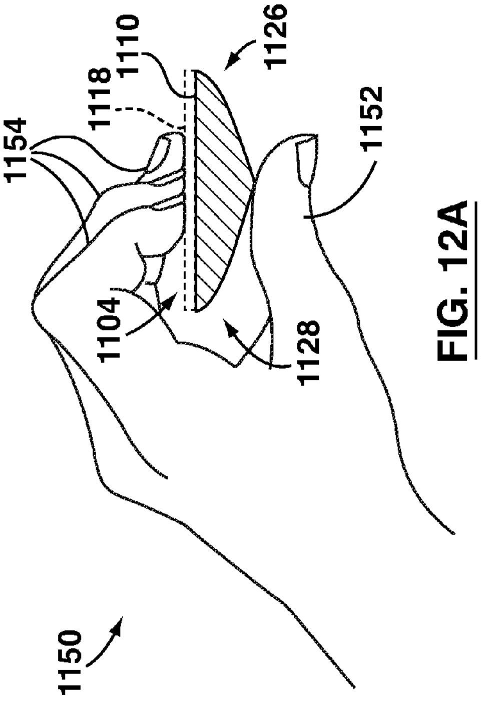
FIG. 12A is the same cross-sectional view shown in FIG. 12, showing exemplary finger and thumb positions of a fretting hand on that part of the neck of the guitar of FIG. 11.
Figure 14A:
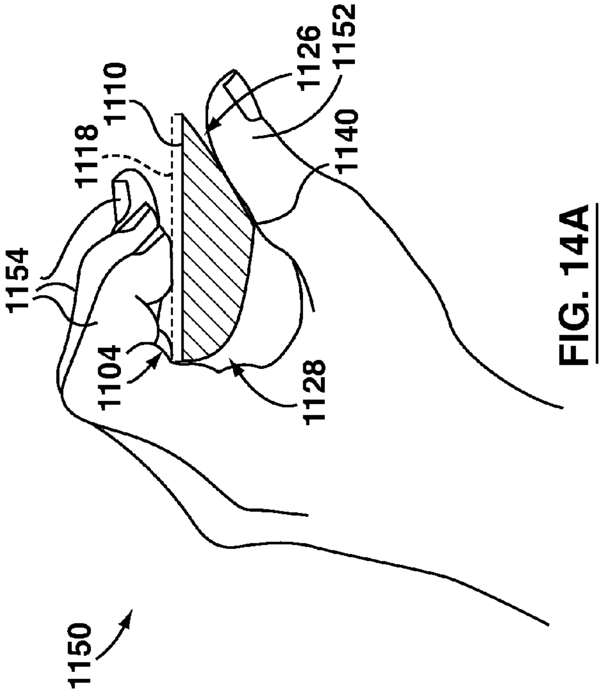
FIG. 14A is the same cross-sectional view shown in FIG. 14, showing exemplary finger and thumb positions of a fretting hand on that part of the neck of the guitar of FIG. 11.

As shown in FIGS. 7 to 10A, the bass side 626 of the neck 604 is chamfered so that the resulting thumb-support surface 130 is substantially planar. The bass side 626 of the neck 604 may alternatively be chamfered so as to have a slightly concave thumb-support surface 630B (FIG. 10B) or a slightly convex thumb-support surface 630C (FIG. 10CC).

The finger and thumb positions of the fretting hand 150 of a guitarist fretting in the lower register portion 120, intermediate portion 124 and upper register portion 122 of the neck 604 of the second exemplary guitar 600 will be similar to those of the first exemplary guitar 100, and exemplary finger and thumb positions for the second exemplary guitar 600 are shown in FIGS. 7A to 10A.

Now referring to FIGS. 11 to 15A, a third exemplary guitar, also an electric guitar, is indicated generally at 1100. The third exemplary guitar 1100 is similar to the first exemplary guitar 106 and the second exemplary guitar 606, and corresponding reference numerals are used to refer to corresponding features, except with the prefix "11" instead of "1" or "6". (Like the second exemplary guitar 606, the third exemplary guitar 1100 shown in FIGS. 11 to 15A would appear substantially identical in top plan view to the first exemplary guitar 100.) The neck 1104 of the third exemplary guitar 1100 is a "V" neck, which aside from the chamfering and associated thumb-support region 1130, has a symmetrical ogive arch shape opposite the fingerboard surface 1110. The curvature of the haunches of the ogive arch is slight, such that the neck 1104 of the third exemplary guitar 1100 is substantially V-shaped in cross-section opposite the fingerboard surface 1110 through the lower register portion 620 into the intermediate portion 1124, that is, from the head end 608 to the intermediate position where the chamfering begins. As with the first and second exemplary guitars 100, 200, with the third exemplary guitar 300 the chamfering is progressive, increasing toward the heel end 1106.

The bass side 1126 of the neck 1104 of the third exemplary guitar 1100 is chamfered, relative to the treble side 1128, in both the upper register portion 1122 and the part of the intermediate portion 1124 closest to the upper register portion 1122, thereby forming an elongate flattened thumb-support surface 1130 on the bass side 1126 of the neck 1104. The thumb-support region 1130 extends between the ridge 640 and the fingerboard surface 610 in the upper register portion 1122 thereof as well as in the part of the intermediate portion 1124 closest to the upper register portion 1122. Unlike the first exemplary guitar 100 and the second exemplary guitar 600, in the third exemplary guitar 1100 the ridge 1140 extends along substantially the entire length of the neck 1104, from the head end 1108 to the heel end 1106. Through the lower register portion 1120 and the intermediate portion 1124, the ridge 1140 is centered on the neck 1104 and forms the apex of the ogive arch formed by the neck 1104, and the ridge begins to deviate toward the bass side 1126 of the neck 1104 in the intermediate portion 1124 of the neck 1104 as the ridge 1140 approaches the heel end 1106 of the neck 1104. Thus, the ridge 1140 is closer to the bass side 1126 of the neck 1104 than to the treble side 1128 in the upper register portion 1122 of the neck 1104.

Figure 15:
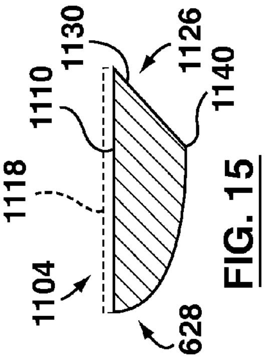
FIG. 15 is a cross-sectional view of the neck of the guitar of FIG. 11, taken along the line 15-15 in FIG. 11.
Figure 15A:
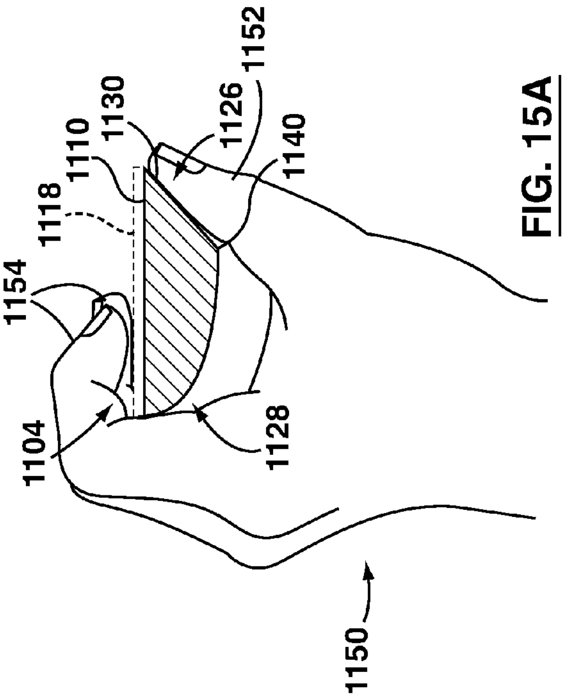
FIG. 15A is the same cross-sectional view shown in FIG. 15, showing exemplary finger and thumb positions of a fretting hand on that part of the neck of the guitar of FIG. 11.
Figure 15C:
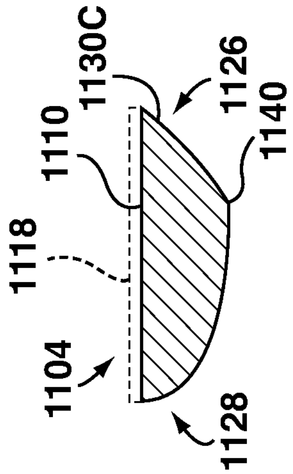
FIG. 15C is a cross-sectional view of a second alternate embodiment of the neck of the guitar of FIG. 11, corresponding in longitudinal position to the cross-sectional view shown in FIG. 15A.
Figure 15B:
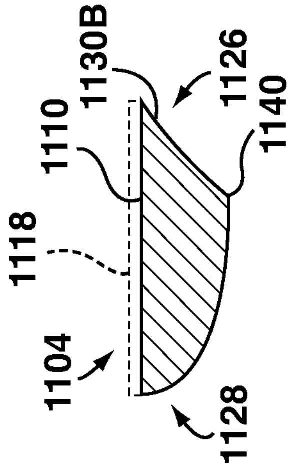
FIG. 15B is a cross-sectional view of a first alternate embodiment of the neck of the guitar of FIG. 11, corresponding in longitudinal position to the cross-sectional view shown in FIG. 15A.

The exemplary neck 1104 shown in FIGS. 12 to 15A is chamfered so that the bass side 1126 of the neck 1104 has a thumb-support surface 130 that is substantially planar; in other embodiments the neck 1104 may be chamfered so as to have a slightly concave thumb-support surface 1130B (FIG. 15B) or a slightly convex thumb-support surface 1130C (FIG. 15C) on the bass side 1126 of the neck 1104.

The finger and thumb positions of the fretting hand 150 of a guitarist fretting in the lower register portion 1120, intermediate portion 1124 and upper register portion 1122 of the neck 1104 of the third exemplary guitar 1100 will be generally similar to those of the first exemplary guitar 100 and the second exemplary guitar 600, and exemplary finger and thumb positions for the third exemplary guitar are shown in FIGS. 12A to 15A.

While electric guitars have been shown and described herein as exemplary embodiments of string instruments of which the herein described necks may form a part, such necks may also be used with electric bass guitars, acoustic guitars, acoustic bass guitars, or with other string instruments such as violins, cellos, banjos, and the like.

Moreover, while the guitars 100, 600, 1100 shown herein are guitars for right-handed players, the features described herein may be applied to guitars, and to other string instruments, intended for left-handed players. For example, a left-handed guitar may be constructed as a mirror image of one of the right-handed guitars shown herein.

Several currently preferred embodiments have been described by way of example. It will be apparent to persons skilled in the art that a number of variations and modifications can be made without departing from the scope of the appended claims.

What is claimed is:

1. A string instrument neck, the neck having:

a heel end for receiving a body of a string instrument;

a head end relative to the heel end;

a longitudinally extending bass side and a longitudinally extending treble side opposite the bass side; and a fingerboard surface;

wherein adjacent the fingerboard surface, the bass side of the neck is continuously chamfered, relative to the treble side of the neck, from an intermediate position between the heel end and the head end of the neck toward the heel end of the neck, for accommodating a user's thumb;

wherein the continuous chamfering forms an elongate ridge extending from the intermediate position toward the heel end of the neck; and the ridge deviates toward the bass side of the neck as the ridge approaches the heel end of the neck.

2. The string instrument neck of claim 1, wherein the bass side of the neck is chamfered to be, from the intermediate position toward the heel end of the neck, one of substantially planar, convex, and concave.

3. A string instrument comprising:

a body; and a string instrument neck according to claim 1 having its heel end secured to the body.

4. The string instrument of claim 3, further comprising a plurality of strings, wherein each string is secured at each end to the string instrument so that the strings extend from the body along the neck.

5. The string instrument of claim 4, wherein the string instrument is a guitar.

6. The string instrument neck according to claim 1, wherein from the head end to the intermediate position, the neck has a cross-sectional shape selected from the group consisting of substantially semi-elliptical, substantially V-shaped and substantially D-shaped.

7. The string instrument neck according to claim 1, wherein the fingerboard surface forms an integral fingerboard.

8. A string instrument neck, the neck having:

a heel end for receiving a body of a string instrument;

a head end relative to the heel end;

a longitudinally extending bass side and a longitudinally extending treble side opposite the bass side; and a fingerboard surface;

the neck comprising:

a lower register portion extending from adjacent the head end toward the heel end;

an upper register portion extending from adjacent the heel end toward the head end; and an intermediate portion between the lower register portion and the upper register portion;

wherein the neck has:

an elongate ridge extending at least through the upper register portion of the neck toward the heel end thereof; and a flattened thumb-support region extending between the ridge and the fingerboard surface on the bass side of the neck;

wherein the ridge and the flattened thumb-support region extend from the intermediate portion of the neck through the upper register portion of the neck; and the ridge deviates toward the bass side of the neck as the ridge approaches the heel end of the neck.

9. The string instrument neck according to claim 8, wherein the flattened thumb-support region is one of substantially planar, convex and concave.

10. The string instrument neck according to claim 8, wherein the fingerboard surface forms an integral fingerboard.

11. A string instrument comprising:

a body; and a string instrument neck according to claim 8, having its heel end secured to the body.

12. The string instrument of claim 11, further comprising a plurality of strings, wherein each string is secured at each end to the string instrument so that the strings extend from the body along the neck.

13. The string instrument of claim 8, wherein the string instrument is a guitar.

14. The string instrument neck according to claim 8, wherein in the lower register portion the neck has a cross-sectional shape selected from the group consisting of substantially semi-elliptical, substantially V-shaped and substantially D-shaped.

15. A string instrument neck, the neck having:

a heel end for receiving a body of a string instrument;

a head end relative to the heel end;

a longitudinally extending bass side and a longitudinally extending treble side opposite the bass side; and a fingerboard surface;

the neck comprising:

a lower register portion extending from adjacent the head end toward the heel end;

an upper register portion extending from adjacent the heel end toward the head end; and an intermediate portion between the lower register portion and the upper register portion;

wherein the neck is substantially symmetrically arch-shaped opposite the fingerboard surface through the lower register portion into the intermediate portion;

in at least the upper register portion, a bass side haunch of the neck is flattened relative to an opposite treble side haunch of the neck to accommodate a user's thumb when fretting in the upper register portion;

an elongate ridge formed by the flattened bass side haunch extends at least through the upper register portion of the neck toward the heel end thereof; and the ridge deviates toward the bass side of the neck as the ridge approaches the heel end of the neck.

16. The string instrument neck of claim 15, wherein, opposite the fingerboard surface through the lower register portion into the intermediate portion, the neck has a cross-sectional shape selected from the group consisting of substantially semi-elliptical, substantially V-shaped and substantially D-shaped.

17. A string instrument comprising:

a body; and a string instrument neck according to claim 15 having its heel end secured to the body.

18. The string instrument neck of claim 17, further comprising a fingerboard secured on the fingerboard surface.

* * * * *

UNITED STATES PATENT AND TRADEMARK OFFICE

CERTIFICATE OF CORRECTION

PATENT NO. : 8,754,312 B2
APPLICATION NO. : 13/431948
DATED : June 17, 2014
INVENTOR(S) : Darren Michael Wilson It is certified that error appears in the above-identified patent and that said Letters Patent is hereby corrected as shown below:

IN THE CLAIMS:

In column 10, line 5, claim 13 should read:

"The string instrument of claim 11, wherein the string instrument is a guitar."

Signed and Sealed this
Thirtieth Day of December, 2014

Michelle K. Lee

Michelle K. Lee
*Deputy Director of the United States Patent and Trademark Office*